US012224699B2

(12) United States Patent
Zhang (10) Patent No.: US 12,224,699 B2
(45) Date of Patent: Feb. 11, 2025

(54) WIND TURBINE GENERATOR SYSTEM, AND ROTATION SPEED AVOIDANCE CONTROL METHOD AND APPARATUS THEREFOR

(71) Applicant: BEIJING GOLDWIND SCIENCE & CREATION WINDPOWER EQUIPMENT CO., LTD., Beijing (CN)

(72) Inventor: Xinli Zhang, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/997,078

(22) PCT Filed: Mar. 30, 2021

(86) PCT No.: PCT/CN2021/084035
§ 371 (c)(1),
(2) Date: Oct. 25, 2022

(87) PCT Pub. No.: WO2022/001250
PCT Pub. Date: Jan. 6, 2022

(65) Prior Publication Data
US 2023/0223875 A1 Jul. 13, 2023

(30) Foreign Application Priority Data
Jun. 28, 2020 (CN) .......................... 202010597078.1

(51) Int. Cl.
*H02P 9/00* (2006.01)
*F03D 7/02* (2006.01)
(Continued)

(52) U.S. Cl.
CPC ............ *H02P 9/008* (2013.01); *F03D 7/0276* (2013.01); *F03D 7/0296* (2013.01);
(Continued)

(58) Field of Classification Search
CPC .. H02P 9/008; H02P 2101/15; H02P 2103/20; F03D 7/0276; F03D 7/0296;
(Continued)

(56) References Cited

U.S. PATENT DOCUMENTS

2006/0033339 A1 2/2006 Pasuri
2017/0067445 A1* 3/2017 Carulla ................. F03D 7/0284
(Continued)

FOREIGN PATENT DOCUMENTS

CL 2022003461 A1 6/2023
CN 103758698 A 4/2014
(Continued)

OTHER PUBLICATIONS

The International Search Report mailed Jul. 6, 2021; PCT/CN2021/084035.
(Continued)

*Primary Examiner* — Joseph Ortega (57) ABSTRACT

A rotation speed exclusion control method for a wind turbine generator system. The method comprises: when a power-limited operation instruction is received, determining a power value upper limit required by the instruction; determining that the required power value upper limit is in a power exclusion interval corresponding to a rotation speed exclusion interval; and when the required power value upper limit is in the power exclusion interval, setting the maximum allowable power value of a wind turbine generator system to be a lower boundary value of the power exclusion interval.

16 Claims, 4 Drawing Sheets

(51) Int. Cl.
   *H02P 101/15*   (2016.01)
   *H02P 103/20*   (2016.01)

(52) U.S. Cl.
   CPC ..... *F05B 2260/96* (2013.01); *F05B 2270/101* (2013.01); *F05B 2270/327* (2013.01); *H02P 2101/15* (2015.01); *H02P 2103/20* (2015.01)

(58) Field of Classification Search
   CPC .......... F03D 7/0298; F03D 7/028; F03D 7/00; F05B 2260/96; F05B 2270/101; F05B 2270/327; F05B 2270/335; Y02E 10/72
   See application file for complete search history.

(56) References Cited

U.S. PATENT DOCUMENTS

| | | |
|---|---|---|
| 2020/0173418 A1 | 6/2020 | Arroyo Beltri et al. |
| 2023/0213018 A1 | 7/2023 | Zhang et al. |

FOREIGN PATENT DOCUMENTS

| | | |
|---|---|---|
| CN | 105041567 A | 11/2015 |
| CN | 105449722 A | 3/2016 |
| CN | 105781876 A | 7/2016 |
| CN | 105927469 A | 9/2016 |
| CN | 108590982 A | 9/2018 |
| CN | 109779835 A | 5/2019 |
| DE | 202014000111 U1 | 3/2014 |
| DE | 102018102863 A1 | 8/2019 |
| EP | 2042729 A1 | 4/2009 |
| WO | 2012/139584 A1 | 10/2012 |

OTHER PUBLICATIONS

The First Chinese Office Action dated Oct. 11, 2022; Appln. No. 202010597078.1.

The Extended European Search Report dated Sep. 5, 2023; Appln. No. 21833227.8.

The First Chilean Office Action dated Jul. 1, 2024; Appln. No. 202203347.

* cited by examiner

WIND TURBINE GENERATOR SYSTEM, AND ROTATION SPEED AVOIDANCE CONTROL METHOD AND APPARATUS THEREFOR

The present application is the national phase of International Patent Application No. PCT/CN2021/084035, titled "WIND TURBINE GENERATOR SYSTEM, AND ROTATION SPEED AVOIDANCE CONTROL METHOD AND APPARATUS THEREFOR", filed on Mar. 30, 2021, which claims priority to Chinese Patent Application No. 202010597078.1, filed on Jun. 28, 2020 with the Chinese Patent Office, both of which are incorporated herein by reference in their entireties.

FIELD

The present application generally relates to the field of wind power generation, and in particular, to a wind turbine, and a method and apparatus for controlling rotational speed exclusion for a wind turbine.

BACKGROUND

As the capacity of wind turbines increases, wind turbines equipped with a high-flexible tower have gradually become a trend thanks to high power generation performance, low costs and other characteristics. However, due to an inherent low frequency of the high-flexible tower itself, a frequency doubled component in an operating rotational speed of the wind turbine overlaps with the inherent frequency of the high-flexible tower. In a conventional design, in order to avoid resonance between a wind turbine at a minimum rotational speed and the tower with a first-order frequency, a value of a minimum rotational speed of a rotor of a generator is limited. This type of manner for controlling the rotational speed is referred as control for rotational speed exclusion. However, since a rated rotational speed of some wind turbines with a large impeller is very low at present, meeting the above limitation on the minimum rotational speed leads to a too narrow range between the minimum rotational speed and the rated rotational speed, resulting in a problem of poor power generation performance of the wind turbines. In order to solve the problem, the resonance with the tower may be avoided by increasing a rotational speed exclusion range while a relatively small minimum rotational speed is set. The rotational speed exclusion range represents a rotational speed range of the rotor of the generator to which a manner for controlling the rotational speed exclusion is adoptable. However, if the rotational speed of the wind turbines is often in or frequently enters the rotational speed exclusion range, the resonance of the wind turbines, increased loads or other safety issues arise.

SUMMARY

A wind turbine, and a method and apparatus for controlling rotational speed exclusion for a wind turbine are provided according to exemplary embodiments of the present disclosure, which can avoid overlapping of an operating range of the rotational speed of the wind turbine in a limited-power operating state and a rotational speed exclusion range.

A method for controlling rotational speed exclusion for a wind turbine is provided according to an exemplary embodiment of the present disclosure. The method include: determining, in response to receiving an instruction for limited-power operation, an upper limit of power required by the instruction: judging whether the required upper limit of power is in a power exclusion range corresponding to a rotational speed exclusion range: setting maximum allowable power of the wind turbine as a lower boundary value of the power exclusion range in a case that the required upper limit of power is in the power exclusion range, where, an upper boundary value of the power exclusion range is power determined based on an upper boundary value of the rotational speed exclusion range, and the lower boundary value of the power exclusion range is power determined based on a lower boundary value of the rotational speed exclusion range, where, the rotational speed exclusion range and the power exclusion range each is an open interval.

An apparatus for controlling rotational speed exclusion for a wind turbine is provided according to another exemplary embodiment of the present disclosure. The apparatus includes a determining unit, a judging unit and a setting unit. The determining unit is configured to determine, in response to receiving an instruction for limited-power operation, an upper limit of power required by the instruction: the judging unit is configured to judge whether the required upper limit of power is in a power exclusion range corresponding to a rotational speed exclusion range: the setting unit is configured to set maximum allowable power of the wind turbine as a lower boundary value of the power exclusion range in a case that the required upper limit of power is in the power exclusion range, where, an upper boundary value of the power exclusion range is power determined based on an upper boundary value of the rotational speed exclusion range, and the lower boundary value of the power exclusion range is power determined based on a lower boundary value of the rotational speed exclusion range, where, the rotational speed exclusion range and the power exclusion range each is an open interval.

A wind turbine is provided according to another exemplary embodiment of the present disclosure. The wind turbine includes a generator, a converter, a data collection module and a controller. The generator includes a stator and a rotor mechanically connected to an impeller: the converter is electrically coupled to a stator winding: the data collection module is configured to collect a rotational speed of the rotor of the generator; and the controller is configured to set an electromagnetic torque parameter of the converter to control the rotational speed of the generator, where the controller performs the foregoing method for controlling rotational speed exclusion.

A wind turbine is provided according to another exemplary embodiment of the present disclosure. The wind turbine includes a generator, a converter, a data collection module and a controller. The generator includes a stator and a rotor mechanically connected to an impeller: the converter is electrically coupled to a stator winding: the data collection module is configured to collect a rotational speed of the rotor of the generator; and the controller is configured to set an electromagnetic torque parameter of the converter to control the rotational speed of the generator, where the controller includes the foregoing apparatus for controlling rotational speed exclusion.

A computer-readable storage medium storing computer programs thereon is provided according to another exemplary embodiment of the present disclosure, where the computer programs, when being executed by a processor, perform the foregoing method for controlling rotational speed exclusion for a wind turbine.

With the wind turbine, the method and apparatus for controlling rotational speed exclusion for the wind turbine according to the exemplary embodiments of the present disclosure, it is enabled to avoid the overlapping of an operating range of the rotational speed of the wind turbine in the limited-power operation state and the rotational speed exclusion range which results in abnormal resonance of the wind turbine, overloaded loads or the like, to ensure the safety and reliability of the operation of the wind turbine.

Additional aspects and/or advantages of general concept of the present disclosure will be set forth partially in the following description, and partially will be apparent from the description, or may be learned by practice of the general concept of the present disclosure.

BRIEF DESCRIPTION OF THE DRAWINGS

The above and other objects and features of exemplary embodiments of the present disclosure will become more apparent from the following description taken in conjunction with the accompanying drawings that exemplarily illustrate embodiments, in which.

DETAILED DESCRIPTION OF THE EMBODIMENTS

Reference will now be made in detail to embodiments of the present disclosure, examples of which are illustrated in the accompanying drawings, in which like reference numerals refer to like parts throughout the description. The embodiments are described hereinafter in combination with the drawings in order to explain the present disclosure.

Figure 1:
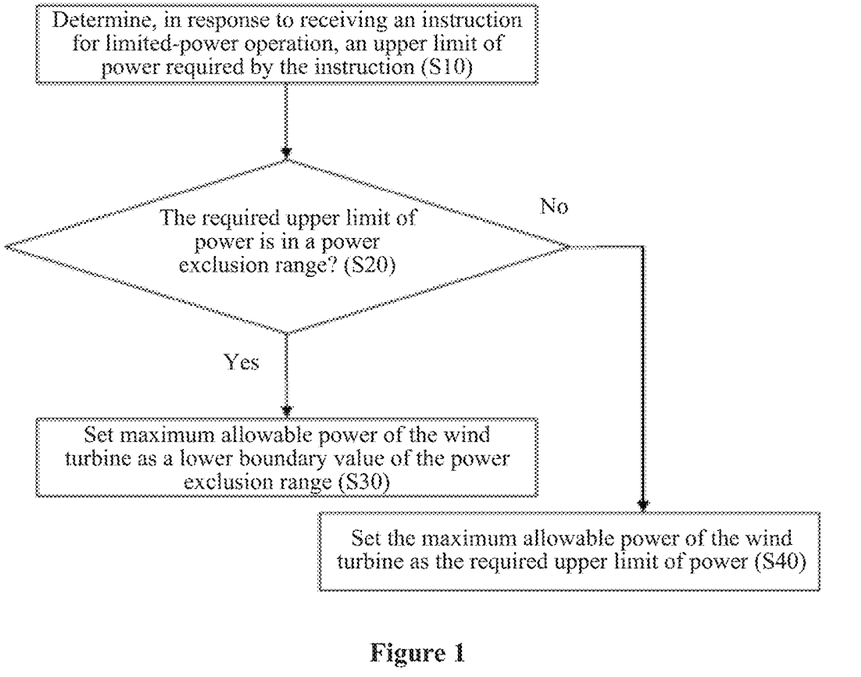
FIG. 1 illustrates a flowchart of a method for controlling rotational speed exclusion for a wind turbine according to an exemplary embodiment of the present disclosure.

FIG. 1 illustrates a flowchart of a method for controlling rotational speed exclusion for a wind turbine according to an exemplary embodiment of the present disclosure.

In step S10, in response to receiving an instruction for limited-power operation, an upper limit of power required by the instruction is determined.

As an example, the instruction for limited-power operation may be received from a central controller at a wind farm or a cluster controller at a wind farm. For example, the wind farm may issue an instruction for limited-power operation to the wind turbine due to electricity rationing or other reasons.

In step S20, it is determined whether the required upper limit of power is in a power exclusion range corresponding to a rotational speed exclusion range.

As an example, the power exclusion range represents a power range corresponding to the rotational speed exclusion range.

As an example, an upper boundary value of the power exclusion range is power determined based on an upper boundary value of the rotational speed exclusion range, and the lower boundary value of the power exclusion range is power determined based on a lower boundary value of the rotational speed exclusion range, where, each of the rotational speed exclusion range and the power exclusion range is an open interval.

Control for rotational speed exclusion/passing through rotational speed is a control function/strategy for the rotational speed of a generator, and specifically refers to that, by controlling an electromagnetic torque of a converter of the wind turbine and the rotational speed of a rotor of the generator, the wind turbine is enabled to quickly pass through a certain rotational speed range (i.e., rotational speed exclusion range) in a power generation process, to prevent the rotational speed from staying in the rotational speed range for a long time, resulting in resonance of the wind turbine, increased loads or other issues. That is, the rotational speed exclusion range mentioned in the present disclosure may be set by a consideration of resonance, load reduction or other conditions, which is not limited in the present disclosure.

Figure 2:
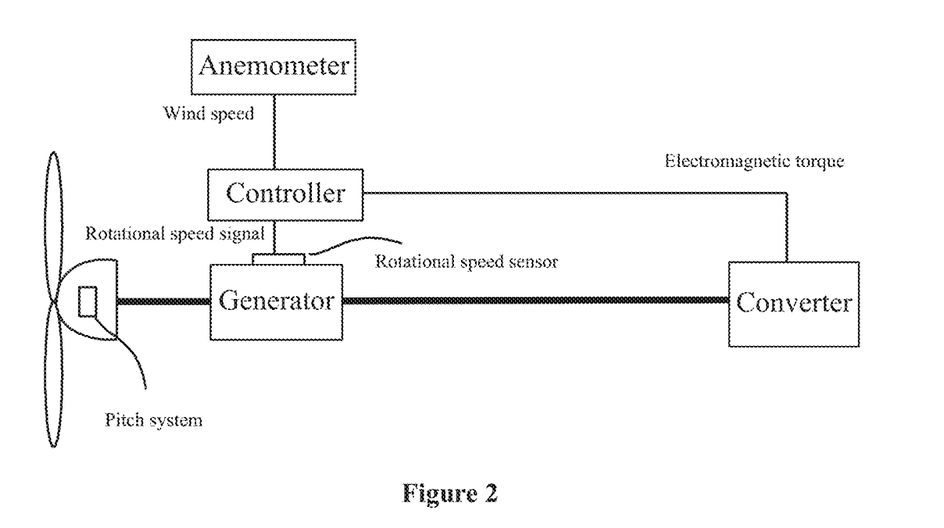
FIG. 2 illustrates a schematic structural diagram of a wind turbine according to an exemplary embodiment of the present disclosure.

Reference is made to FIG. 2, wind energy is captured by an impeller of the wind turbine, and an energy conversion unit is formed by the generator and the converter, and converts the wind energy into electrical energy and transmits the electrical energy to the grid. In the example of FIG. 2, the generator includes a stator and a rotor mechanically connected to the impeller. The converter is electrically coupled to a stator winding. In the present example, the generator is a permanent magnet generator with magnet steel being provided in the rotor. The wind turbine is a direct-drive type wind turbine, the converter is a full-power converter, and the electric energy converted from the wind energy is all fed into the grid. A controller of the wind turbine collects the wind speed and a current rotational speed of the generator and transmits an electromagnetic torque control signal to the converter for controlling the current in the stator winding of the generator, to control the rotational speed of the rotor of the generator. It can be known from the aerodynamic torque formula $T_a=0.5\rho C_q \pi R^3 V^2$, an aerodynamic torque $T_a$ is direct proportional to a square of the wind speed V, where $\rho$ represents the air density of an external environment where the wind turbine locates, $C_q$ represents a torque coefficient of the wind turbine, and R represents the radius of the impeller. The wind turbine may control a pitch angle of each blade through a pitch system, to limit the energy of a wind flow absorbed by the impeller, and then adjust the aerodynamic torque. The generator may control an electromagnetic torque $T_e$ of the generator while performing the electrical energy conversion. As can be known from $\Delta T=T_a-T_e$ and $dw=\Delta T/J1$, a differential of the rotational speed of the generator is related to a difference between the aerodynamic torque $T_a$ and the electromagnetic torque $T_e$, where J1 represents a moment of inertia, and w represents an angular velocity. Therefore, the entire wind turbine may adjust the aerodynamic torque $T_a$ and the electromagnetic torque $T_e$ through a pitch mechanism to control the rotational speed of the wind turbine.

Figure 3:
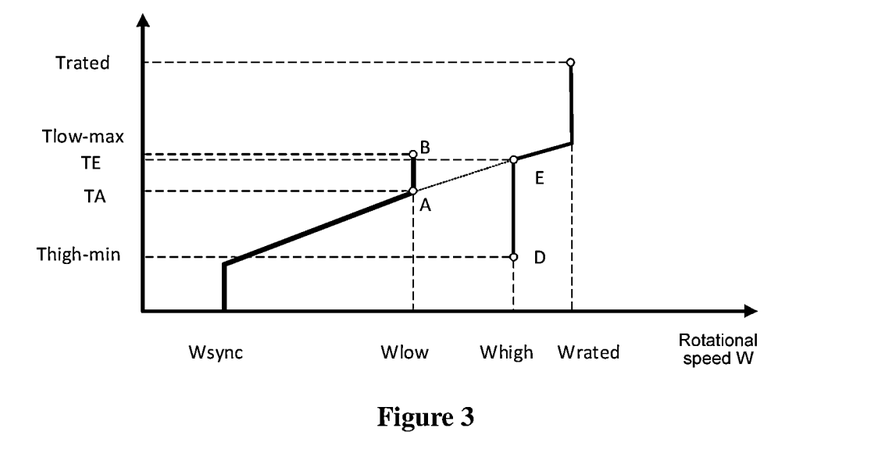
FIG. 3 illustrates a schematic diagram of controlling rotational speed exclusion according to an exemplary embodiment of the present disclosure.

FIG. 3 illustrates a rotational speed-electromagnetic torque operation curve of the generator, in which the ordinate represents the electromagnetic torque and the abscissa represents the rotational speed. In a case that the wind turbine operates normally, the rotational speed is between Wsync and Wrated, and (Wlow, Whigh) is the rotational speed exclusion range. Wlow is the lower boundary value of the rotational speed exclusion range, and Whigh is the upper boundary value of the rotational speed exclusion range, that is, the wind turbine cannot stay in the rotational speed range for a long time. Tlow-max and Thigh-min correspond to requirements for controlling the electromagnetic torque at two rotational speeds of Wlow and Whigh respectively. Specifically, when the rotational speed reaches point A along with the wind speed, the rotational speed cannot continue to rise according to requirements for controlling rotational speed exclusion. In this case the rotational speed is controlled at Wlow. If the wind speed increases in this case, in order to maintain the rotational speed at Wlow, the electromagnetic torque increases continually from TA until reaching Tlow-max (that is, reaching point B). After the rotational speed stays at the point B for T1 seconds, the rotational speed is increased at a speed of V1 rad/s until the rotational speed reaches Whigh, that is, an operating state reaches point E. If the wind speed further increases in this case, the rotational speed continues to increase upward. When the wind speed decreases at the point E, the rotational speed cannot continue to decrease according to the requirements for controlling rotational speed exclusion. The rotational speed is maintained at Whigh in this case. If the wind speed decreases in this case, in order to maintain the rotational speed at Whigh, the electromagnetic torque decreases continually from TE until reaching Thigh-min (that is, reaching point D). After staying at the point D for T2 seconds, the rotational speed is reduced at a speed of V2 rad/s to jump to the point A. Wlow and Whigh may be determined based on a design frequency (e.g., an inherent frequency of structural components including the tower) of the wind turbine.

As an example, the upper boundary value of the power exclusion range may be a product of the upper boundary value (i.e., Whigh) of the rotational speed exclusion range and a first predetermined electromagnetic torque (i.e., Tlow-max), where the first predetermined electromagnetic torque is an electromagnetic torque that is to be kept before passing through the rotational speed exclusion range from a low rotational speed to a high rotational speed.

As an example, the lower boundary value of the power exclusion range may be a product of the lower boundary value (i.e., Wlow) of the rotational speed exclusion range and a second predetermined electromagnetic torque (i.e., TA), where the second predetermined electromagnetic torque is an electromagnetic torque when the wind turbine just reaches the lower boundary value of the rotational speed exclusion range.

Returning to FIG. 1, when it is determined in step S20 that the required upper limit of power is in the power exclusion range, step S30 is performed to set the maximum allowable power of the wind turbine as the lower boundary value of the power exclusion range. In other words, the power of the wind turbine is not allowed to exceed the lower boundary value of the power exclusion range. In addition, feedback may be given to an object that transmits the instruction for limited-power operation, for example, information that the maximum allowable power of the wind turbine is set as the lower boundary value of the power exclusion range may be fed back.

In a case that it is determined in step S20 that the required upper limit of power is not in the power exclusion range, step S40 is performed to set the maximum allowable power of the wind turbine as the required upper limit of power. In other words, the power of the wind turbine is not allowed to exceed the required upper limit of power.

As an example, the method for controlling rotational speed exclusion for a wind turbine according to an exemplary embodiment of the present disclosure may further include: identifying whether there is an abnormality of repeatedly passing through the rotational speed exclusion range in the wind turbine, based on statistical information about the rotational speed of the generator being in the rotational speed exclusion range, where, in a case that it is determined that there is an abnormality, step S20 is performed.

As an example, the statistical information about the rotational speed of the generator being in the rotational speed exclusion range may be statistical information that may be used to judge whether the rotational speed of the generator is often in or frequently enters the rotational speed exclusion range. As an example, the statistical information about the rotational speed of the generator being in the rotational speed exclusion range may include: a statistical duration about the rotational speed of the generator being in the rotational speed exclusion range and/or a statistical counting that the rotational speed enters the rotational speed exclusion range.

As an example, a rotational speed exclusion condition of the wind turbine may refer to a condition in which the rotational speed of the generator enters or is in the rotational speed exclusion range. As an example, in a case that the statistical information about the rotational speed of the generator being in the rotational speed exclusion range shows that the rotational speed is often in or frequently enters the rotational speed exclusion range exceeding a certain degree, it may be determined that there is an abnormality of repeatedly passing through the rotational speed exclusion range in the wind turbine.

Considering the accuracy of the control, a range may be reserved at both ends of the rotational speed exclusion range, and it is considered that the rotational speed being in the reserved range is a normal operation condition. As an example, the statistical information about the rotational speed of the generator being in the rotational speed exclusion range may include: the statistical duration in which the rotational speed of the generator is in a first predetermined range in the rotational speed exclusion range and/or the statistical number of times that the rotational speed enters the first predetermined range. Here, the first predetermined range may be: (Wlow+We1, Whigh−We2).

As an example, the rotational speed of the generator may or may not be equal to the rotational speed of the impeller.

As an example, the step of identifying whether there is an abnormality of repeatedly passing through the rotational speed exclusion range in the wind turbine based on a statistical duration in which a rotational speed of a generator is in the rotational speed exclusion range may include: determining, based on operation data in a historical operation period of the wind turbine, a proportion of a rotational speed exclusion duration corresponding to each of time intervals in the historical operation period, where the proportion of a rotational speed exclusion duration corresponding to each of time intervals is a proportion of a total duration, in which the rotational speed is in a first predetermined range in the rotational speed exclusion range within the time interval, to a predetermined duration; and determining that there is an abnormality of repeatedly passing through the rotational speed exclusion range in the wind turbine, in a case that a total number of time intervals in which a proportion of the rotational speed exclusion duration exceeds a predetermined standard proportion in the historical operation period, exceeds a first predetermined number, where, each of time intervals has a length of the predetermined duration.

As an example, the operation data in the historical operation period may be divided into M groups of operation data in an interval of the predetermined duration, where each group of operation data includes N rotational speeds of the generator collected at N consecutive sampling time points (that is, N rotational speeds are collected by collecting one rotational speed at each sampling time point). A ratio of the number of rotational speeds in the first predetermined range in the N rotational speeds of each group to N is determined as the proportion of the rotational speed exclusion duration corresponding to the corresponding time range, where, M is an integer greater than 1, and N is an integer greater than 1. It should be understood that each group corresponds to a time interval, and different groups correspond to different time intervals.

As an example, the predetermined standard proportion may indicate that a proportion of the total duration of the rotational speed in the rotational speed exclusion range to the predetermined duration within the predetermined duration, in a case of a normal rotational speed exclusion jump. Therefore, the proportion of the rotational speed exclusion duration corresponding to any time interval exceeding the proportion of normality indicates that the rotational speed exclusion in the time interval is abnormal.

As an example, the predetermined standard proportion may be determined based on at least one of the following: a jump-up duration (i.e., (Whigh−Wlow)/V1) required for the wind turbine to pass through the rotational speed exclusion range from a low rotational speed to a high rotational speed, a jump-down duration (i.e., (Whigh−Wlow)/V2) required to pass through the rotational speed exclusion range from a high rotational speed to a low rotational speed, a predetermined number of times that the rotational speed exclusion range can be normally passed through within the predetermined duration, and a length of the predetermined duration.

As an example, the predetermined standard proportion may be Ks: $T_{max}*I*J/L$, where, $T_{max}$ represents a maximum among the jump-up duration and the jump-down duration, I represents a redundancy coefficient, J represents the predetermined number of times that the rotational speed exclusion range can be normally passed through within the predetermined duration, and L represents the length of the predetermined duration.

Here, the number of times that the rotational speed exclusion range can be normally passed through within the predetermined duration may be determined based on at least one of actual operation conditions, simulation, and human experience. For example, in a case that the length of the predetermined duration is 20 minutes, the number of times that the rotational speed exclusion range can be normally passed through within the predetermined duration may be 10. In order that a certain redundancy is reserved when using the predetermined standard proportion for judgment and a certain degree of deviation is acceptable, a redundancy coefficient I is added. For example, I may be set to a value between 1.1 and 1.5. As an example, $T_{max}$ may be a value between 10s and 30s, for example, Wlow=7 rpm, Whigh=11 rpm, the set V1 is equal to V2, which is 0.2 rpm/s (that is, the requirement for controlling rotational speed exclusion is quickly passing through the rotational speed exclusion range at a speed of 0.2 rpm per second), the time for normal passing through/jumping one rotational speed exclusion range is T1=T2=(Whigh-Wlow)/V1=20s. Assuming that a jump-up speed V1 is equal to a jump-down speed V2, then the jump-up time (Whigh-Wlow)/V1 is equal to the jump-down time (Whigh-Wlow)/V2), and $T_{max}$=20s in that case. For example, in a case that L=20 min, J=10, I=1.2, and $T_{max}$=20s, the predetermined standard proportion is 0.2.

Figure 4:
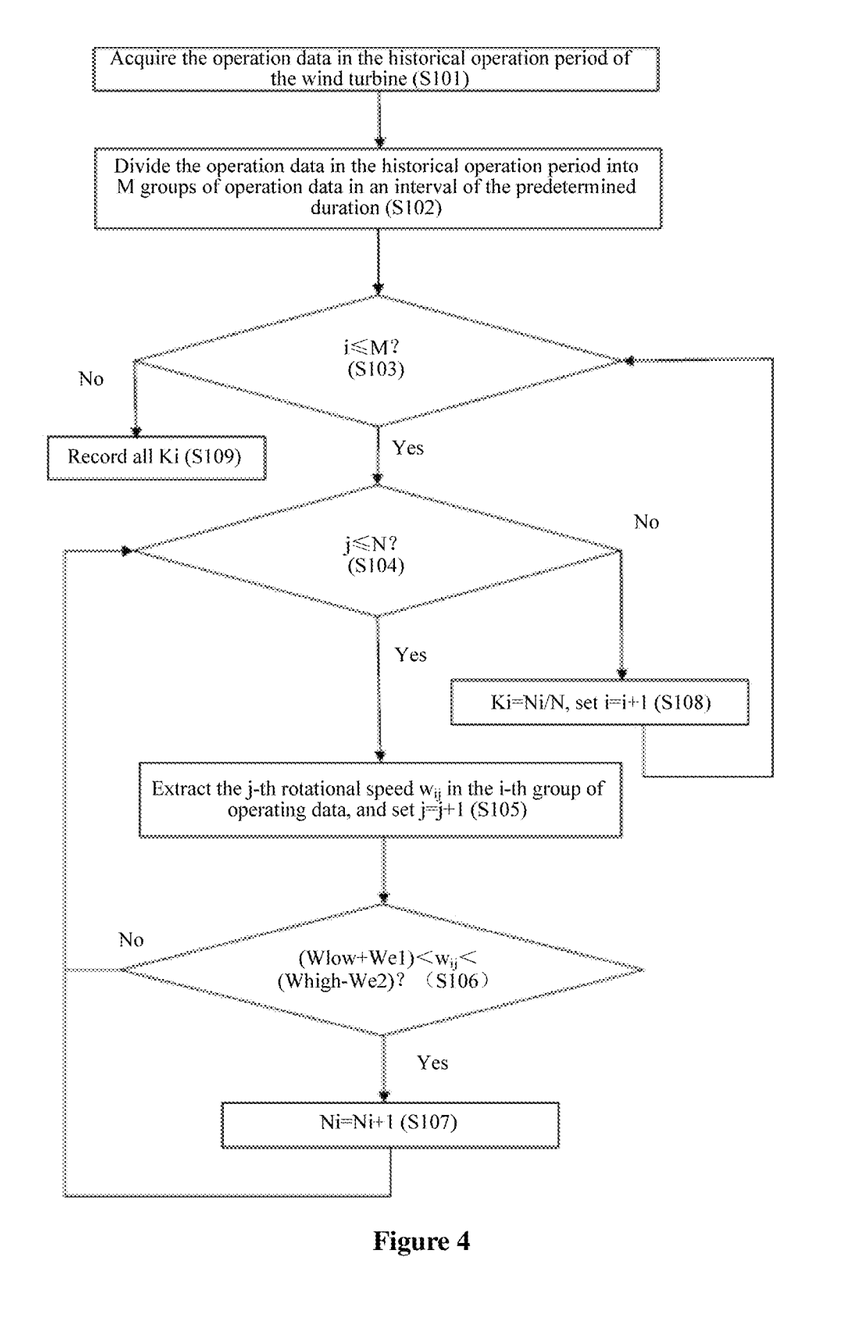
FIG. 4 illustrates a flowchart of a method for determining a proportion of a rotational speed exclusion duration corresponding to each of time intervals in a historical operating period according to an exemplary embodiment of the present disclosure.

FIG. 4 illustrates a flowchart of a method for determining a proportion of a rotational speed exclusion duration corresponding to each of time intervals in a historical operating period according to an exemplary embodiment of the present disclosure.

As shown in FIG. 4, in step S101, the operation data in the historical operation period of the wind turbine is acquired, where the operation data includes the rotational speed.

In step S102, the operation data in the historical operation period may be divided into M groups of operation data in an interval of the predetermined duration. Specifically, the historical operation period is divided every predetermined duration, and the obtained operational data for each of time intervals forms a group of operational data. Each group of operation data includes N rotational speeds of the generator collected at N consecutive sampling time points (i.e., N operation points), and the N rotational speeds are ranked in an order of corresponding sampling time points. It should be understood that N depends on the length of the predetermined duration and a sampling period of operation data.

As an example, the historical operation period may be the latest month, and the predetermined duration may be a value from 10 min to 30 min.

In step S103, it is judged whether i is less than or equal to M, where the initial value of i is 1.

In a case that it is determined in step S103 that i is less than or equal to M, step S104 is performed to judge whether j is less than or equal to N, where the initial value of j is 1.

In a case that it is determined in step S104 that j is less than or equal to N, step S105 is performed to extract the j-th rotational speed $w_{ij}$ in the i-th group of operating data, and set j=j+1.

After step S105, step S106 is performed to judge whether the extracted j-th rotational speed $w_{ij}$ in the i-th group of operating data is greater than (Wlow+We1) and less than (Whigh-We2).

In a case that it is determined in step S106 that $w_{ij}$ is greater than (Wlow+We1) and less than (Whigh-We2), step S107 is performed to set Ni=Ni+1, and return to step S104, where the initial value of Ni is 0.

In a case that it is determined in step S106 that $w_{ij}\le$ (Wlow+We1), or $w_{ij}\ge$(Whigh-We2), the process returns to step S104.

In a case that it is determined in step S104 that j is greater than N, step S108 is performed to set Ki=Ni/N and i=i+1, and the process returns to step S103.

In a case that it is determined in step S103 that i is greater than M, step S109 is performed to record all Ki, that is, record K1, K2, K3, . . . , KM. Here, each Ki is the proportion of the rotational speed exclusion duration corresponding to each of time intervals in the historical operation period.

Figure 5:
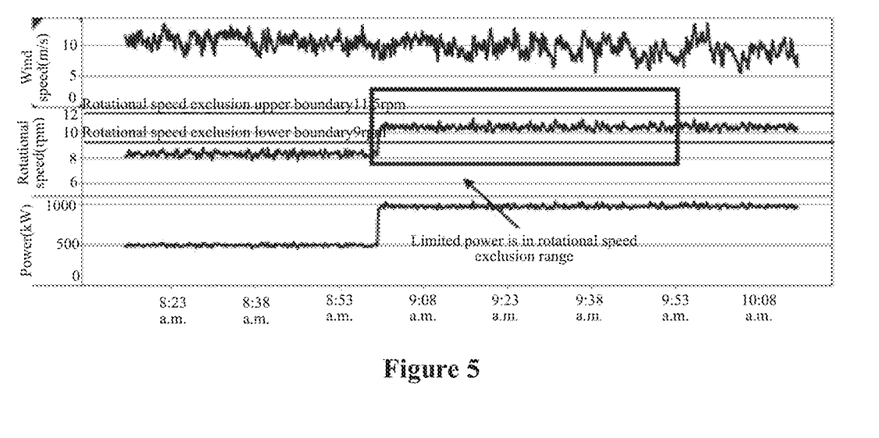
FIG. 5 illustrates an example in which a rotational speed of a wind turbine is frequently locating in a rotational speed exclusion range according to an exemplary embodiment of the present disclosure.

The problem that the rotational speed exclusion range is repeatedly passed through for the wind turbine is considered in the present disclosure. As shown in FIG. 5, the rotational speed exclusion range is (9, 11.5). FIG. 5 illustrates a situation that the rotational speed of the wind turbine is frequently in the rotational speed exclusion range, which will result in abnormal resonance of the wind turbine, overloaded loads and other problems. After analysis, it is known in the present disclosure that this situation is generally due to the fact that if an instruction for limited power is received from outside, the wind turbine controls a current rotational speed of the generator based on the limited power. If the rotational speed corresponding to a power limit is just within the rotational speed exclusion range, as shown in FIG. 5, the power limit is 1MW, and the corresponding rotational speed is 10.5 rpm, causing a rotational speed exclusion function to fail, which causes that the wind turbine operates in the rotational speed exclusion range for a long time, and the situation of rotational speed exclusion is abnormal.

In the conventional technology, the abnormal evaluation of wind turbines repeatedly passing through the rotational speed exclusion range is still blank. The main reason lies in that due to the uncertainty of the above reasons, the abnormality is difficult to find during a prototype test, especially electricity rationing at the wind farm has great uncertainty. The abnormality of repeatedly passing through the rotational speed exclusion range often brings the following two problems: 1. the wind turbine is operating in the rotational speed exclusion range for a long time, and in a case that the vibration increases to a corresponding protection threshold, a shutdown failure occurs: 2. the wind turbine is operating in the rotational speed exclusion range for a long time or a short time, but the vibration does not reach the corresponding protection threshold, the impact (for example, a shutdown failure) may not be realized in the short term, however, loss of power generation and loss of fatigue life of components occur after the long-term accumulation, resulting in the expense of loss of power generation and component damage, and it is difficult to find that the above problem is due to the abnormal rotational speed exclusion.

Therefore, as an example, in a case that the rotational speed of the generator is frequently in the rotational speed exclusion range in the limited-power operating state, it may be determined that there is an abnormality of repeatedly passing through the rotational speed exclusion range for the wind turbine.

As an example, it may be determined that there is an abnormality of repeatedly passing through the rotational speed exclusion range for the wind turbine, in a case that a total number of time intervals, corresponding to a limited-power operation state and in which a proportion of the rotational speed exclusion duration exceeds a predetermined standard proportion in the historical operation period, exceeds a second predetermined number. In other words, it is determined that the rotational speed exclusion is abnormal and the reason for the abnormal rotational speed exclusion is that a maximum operating range of the rotational speed determined by the wind turbine based on the instruction for limited-power overlaps with the rotational speed exclusion range. Therefore, it is required to perform steps S20 to S30, to avoid the abnormality of the rotational speed exclusion for the wind turbine as much as possible. Here, the time interval corresponding to the limited-power operation state refers to a time interval in which the wind turbine is in the limited-power operation state.

As another example, it may be determined that there is an abnormality of repeatedly passing through the rotational speed exclusion range for the wind turbine, in a case that a total number of time intervals, corresponding to a predetermined wind speed range and in which a proportion of the rotational speed exclusion duration exceeds a predetermined standard proportion in the historical operation period, exceeds a third predetermined number, where the predetermined wind speed range is a wind speed range in the vicinity of a wind speed range corresponding to the rotational speed exclusion range. As an example, the wind speed range corresponding to the rotational speed exclusion range is a wind speed range in which the rotational speed enters the rotational speed exclusion range. As an example, the wind speed range in the vicinity of the wind speed range corresponding to the rotational speed exclusion range may be a wind speed range including the wind speed range corresponding to the rotational speed exclusion range, the lower boundary value of the wind speed range is smaller than the lower boundary value of the wind speed range corresponding to the rotational speed exclusion range by a first predetermined value, and the upper boundary value of the wind speed range is greater than the upper boundary value of the wind speed range corresponding to the rotational speed exclusion range by a second predetermined value. The time interval corresponding to the predetermined wind speed range refers to a time interval in which an ambient wind speed of the wind turbine is in the predetermined wind speed range.

Figure 6:
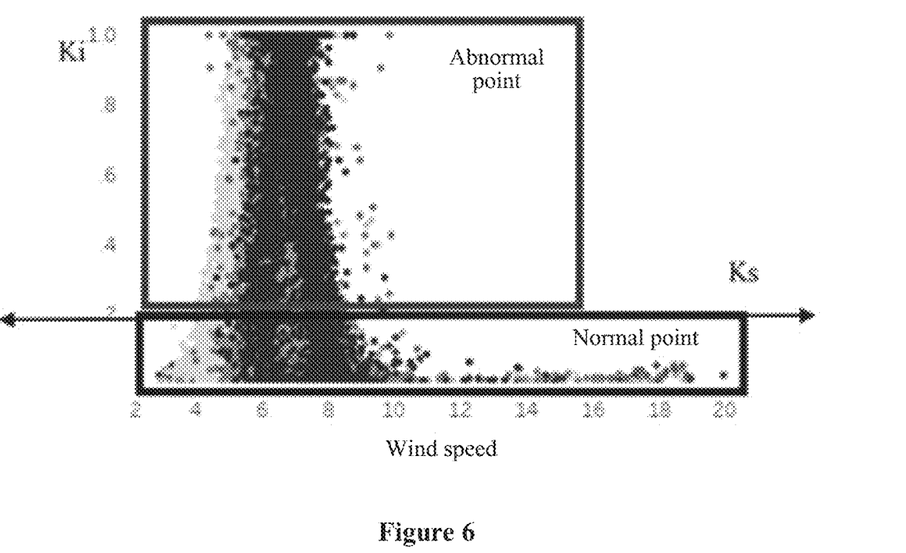
FIG. 6 illustrates a distribution diagram of a proportion of a rotational speed exclusion duration according to an exemplary embodiment of the present disclosure.

FIG. 6 illustrates the distribution of the proportion $K_i$ of the rotational speed exclusion duration corresponding to different time intervals of the wind turbine. The abscissa in FIG. 6 represents the wind speed, and the ordinate represents the value of $K_i$. The predetermined standard proportion $K_s$ is 0.2, and each point represents the proportion of the rotational speed exclusion duration corresponding to the wind turbine in one time interval. Therefore, the point where the proportion of the rotational speed exclusion duration exceeds 0.2 is an abnormal point, otherwise is a normal point. It can be seen that the set of points in FIG. 6 has an apparent columnar structure, and the highest point is in the vicinity of the wind speed of 6 m/s which corresponds to points of wind speed corresponding to the rotational speed exclusion range. The energy provided by the wind keeps the rotational speed between the upper boundary value and the lower boundary value of the rotational speed exclusion range, namely, if the wind speed is relatively small, the rotational speed stays at the lower boundary value for a long time, and if the wind speed is relatively large, the rotational speed stays at the upper boundary value for a long time. As shown in FIG. 6, the abnormal points are distributed in a columnar shape, and the maximum $K_i$ value of the abnormal points reaches 1. That is, in some time intervals, the rotational speed of the wind turbine is in the rotational speed exclusion range for a long time. Therefore, based on the distribution of the proportion of the rotational speed exclusion duration (that is, there are a large number of abnormal points where the corresponding wind speed is in the vicinity (i.e., 4 m/s to 9 m/s) of the wind speed range corresponding to the rotational speed exclusion range, and these abnormal points are distributed in a columnar shape, the $K_i$ value of some abnormal points is large), it may be determined that the abnormal rotational speed exclusion for the wind turbine is caused by the limited-power operation. Specifically, the power of the wind turbine is related to the rotational speed. The higher the power generally corresponds to the higher the rotational speed of the wind turbine. Therefore, a set value of rotational speed corresponding to the required power limit is retrieved in the limited-power operation, and is used as a control target of the rotational speed. Once the set value of rotational speed corresponding to the required value of power limit is in the rotational speed exclusion range, the rotational speed exclusion situation is abnormal. Therefore, the above circumstance can be improved by performing steps S20 to S30.

According to exemplary embodiments of the present disclosure, it is enabled to quickly and accurately assess whether there is an abnormality in the rotational speed exclusion for the wind turbine, and further perform corresponding processing for the cause of the abnormal situation of rotational speed exclusion in combination with analysis and diagnosis of basic causes, in order to jump out the abnormality and return to a normal operating state of the wind turbine, thus avoiding further vibration exceeding the limit and increased load.

Figure 7:
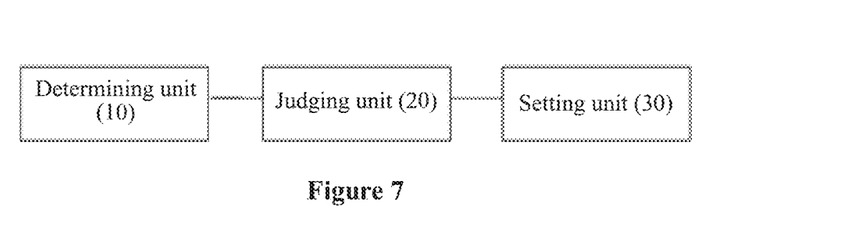
FIG. 7 illustrates a block diagram of an apparatus for controlling rotational speed exclusion for a wind turbine according to an exemplary embodiment of the present disclosure.

FIG. 7 illustrates a block diagram of an apparatus for controlling rotational speed exclusion for a wind turbine according to an exemplary embodiment of the present disclosure.

As shown in FIG. 7, the apparatus for controlling rotational speed exclusion for a wind turbine according to an exemplary embodiment of the present disclosure includes: a determining unit 10, a judging unit 20, and a setting unit 30.

Specifically, the determining unit 10 is configured to determine, in response to receiving an instruction for limited-power operation, an upper limit of power required by the instruction.

The judging unit 20 is configured to judge whether the required upper limit of power is in a power exclusion range corresponding to a rotational speed exclusion range. An upper boundary value of the power exclusion range is power determined based on an upper boundary value of the rotational speed exclusion range, and a lower boundary value of the power exclusion range is power determined based on a lower boundary value of the rotational speed exclusion range, where each of the rotational speed exclusion range and the power exclusion range is an open interval.

The setting unit 30 is configured to set maximum allowable power of the wind turbine as the lower boundary value of the power exclusion range in a case that the required upper limit of power is in the power exclusion range.

As an example, the setting unit 30 may set the maximum allowable power of the wind turbine to the required upper limit of power in a case that the required upper limit of power is not in the power exclusion range.

As an example, the upper boundary value of the power exclusion range may be a product of the upper boundary value of the rotational speed exclusion range and a first predetermined electromagnetic torque, and the lower boundary value of the power exclusion range may be a product of the lower boundary value of the rotational speed exclusion range and a second predetermined electromagnetic torque. The first predetermined electromagnetic torque is an electromagnetic torque value that is to be kept before passing through the rotational speed exclusion range from a low rotational speed to a high rotational speed, and the second predetermined electromagnetic torque is an electromagnetic torque value when the wind turbine reaches the lower boundary value of the rotational speed exclusion range.

As an example, the apparatus may further include: an abnormality identifying unit (not shown). The abnormality identifying unit is configured to identify whether there is an abnormality of repeatedly passing through the rotational speed exclusion range for the wind turbine based on statistical information about a rotational speed of a generator being in the rotational speed exclusion range. In a case that there is an abnormality, the judging unit 20 determines whether the required upper limit of power is in the power exclusion range corresponding to the rotational speed exclusion range.

As an example, the statistical information about the rotational speed of the generator being in the rotational speed exclusion range may include: a statistical duration in which the rotational speed of the generator is in the rotational speed exclusion range and/or a statistical number of times that the rotational speed enters the rotational speed exclusion range.

As an example, the abnormality identifying unit may determine, based on operation data in a historical operation period of the wind turbine, a proportion of a rotational speed exclusion duration corresponding to each of time intervals in the historical operation period; and determine that there is an abnormality of repeatedly passing through the rotational speed exclusion range for the wind turbine, in a case that a total number of time intervals in which a proportion of the rotational speed exclusion duration exceeds a predetermined standard proportion in the historical operation period, exceeds a first predetermined number. The proportion of a rotational speed exclusion duration corresponding to each of time intervals is a proportion of a total duration, in which the rotational speed is in a first predetermined range in the rotational speed exclusion range within the time interval, to a predetermined duration. Each of time intervals has a length of the predetermined duration.

As an example, the abnormality identifying unit may determine that there is an abnormality of repeatedly passing through the rotational speed exclusion range for the wind turbine, in a case that a total number of time intervals corresponding to a limited-power operation state and in which a proportion of the rotational speed exclusion duration exceeds a predetermined standard proportion in the historical operation period, exceeds a second predetermined number. Alternatively, the abnormality identifying unit may determine that there is an abnormality of repeatedly passing through the rotational speed exclusion range for the wind turbine, in a case that a total number of time intervals corresponding to a predetermined wind speed range and in which a proportion of the rotational speed exclusion duration exceeds a predetermined standard proportion in the historical operation period, exceeds a third predetermined number, where, the predetermined wind speed range is a wind speed range in the vicinity of a wind speed range corresponding to the rotational speed exclusion range.

As an example, the abnormality identifying unit may divide the operation data in the historical operation period into M groups of operation data in an interval of the predetermined duration, where each group of operation data includes N rotational speeds of the generator collected at N consecutive sampling time points; and determine a ratio of the number of rotational speeds in the first predetermined range in the N rotational speeds of each group to N as the proportion of the rotational speed exclusion duration corresponding to the respective each interval, where, M is an integer greater than 1, and N is an integer greater than 1.

As an example, the predetermined standard proportion may be determined based on at least one of the following: a jump-up duration required for the wind turbine to pass through the rotational speed exclusion range from a low rotational speed to a high rotational speed, a jump-down duration required to pass through the rotational speed exclusion range from a high rotational speed to a low rotational speed, a predetermined number of times that the rotational speed exclusion range can be normally passed through within the predetermined duration, and a length of the predetermined duration.

As an example, the predetermined standard proportion may be $T_{max}*I*J/L$, where, $T_{max}$ represents a maximum among the jump-up duration and the jump-down duration, I represents a redundancy coefficient, J represents the predetermined number of times that the rotational speed exclusion range can be normally passed through within the predetermined duration, and L represents the length of the predetermined duration.

It should be understood that specific processing performed by the apparatus for controlling rotational speed exclusion for the wind turbine according to the exemplary embodiment of the present disclosure has been described in detail with reference to FIGS. 1 to 6, and the relevant details will not be repeated here.

It should be understood that each of units in the apparatus for controlling rotational speed exclusion for a wind turbine according to the exemplary embodiment of the present disclosure may be implemented as hardware components and/or software components. Those skilled in the art may implement the various apparatus based on the defined processing to be performed by each apparatus using a field programmable gate array (FPGA) or an application specific integrated circuit (ASIC), for example.

In addition, a wind turbine is provided according to an exemplary embodiment of the present disclosure. As shown in FIG. 2, the wind turbine includes a generator, a converter, a data collection module (not shown in the figure) and a controller. The generator includes a stator and a rotor mechanically connected to an impeller: the converter is electrically coupled to a stator winding: the data collection module is configured to collect a rotational speed of the rotor of the generator; and the controller is configured to set an electromagnetic torque parameter of the converter to control the current in the stator winding, thereby controlling the rotational speed of the rotor of the generator. The controller is configured to perform the method for controlling rotational speed exclusion for a wind turbine according to the foregoing exemplary embodiments. As an example, the data collection module may include a rotational speed sensor. In addition, the data collection module may further be configured to collect information such as electromagnetic torque and ambient wind speed of the wind turbine.

In addition, a wind turbine is further provided according to an exemplary embodiment of the present disclosure. As shown in FIG. 2, the wind turbine includes a generator, a converter, a data collection module (not shown in the figure) and a controller. The generator includes a stator and a rotor mechanically connected to an impeller: the converter is electrically coupled to a stator winding: the data collection module is configured to collect a rotational speed of the rotor of the generator; and the controller is configured to set an electromagnetic torque parameter of the converter to control the current in the stator winding, thereby controlling the rotational speed of the rotor of the generator. The controller includes the apparatus for controlling rotational speed exclusion for a wind turbine according to the forgoing exemplary embodiments.

A computer-readable storage medium storing computer programs thereon is provided according to an exemplary embodiment of the present disclosure. The computer programs, when being executed by a processor, implement the method for controlling rotational speed exclusion for a wind turbine according to the foregoing exemplary embodiments. The computer-readable storage medium is any data storage device that can store data read by a computer system. Examples of the computer-readable storage medium include a read-only memory, a random-access memory, read-only optical disks, magnetic tapes, floppy disks, optical data storage devices, and carrier waves (such as data transmission over the Internet via wired or wireless transmission paths).

Although some embodiments of the present disclosure are described hereinabove, those skilled in the art should appreciate that the embodiments may be modified without deviating from the principles and the spirit of the present disclosure which are limited by the claims and the equivalent thereof.

The invention claimed is:

1. A method for controlling a rotational speed exclusion range for a wind turbine, comprising:
   determining an upper limit of power required by an instruction for a limited-power operation of the wind turbine;
   identifying an abnormality of the rotational speed exclusion range for the wind turbine based on statistical information about a rotational speed of a generator operating in the rotational speed exclusion range;
   judging that the required upper limit of power is in a power exclusion range corresponding to the rotational speed exclusion range during the abnormality;
   setting a maximum allowable power of the wind turbine as a lower boundary value of the power exclusion range during the required upper limit of power is in the power exclusion range,
   wherein an upper boundary value of the power exclusion range is power determined based on an upper boundary value of the rotational speed exclusion range, and the lower boundary value of the power exclusion range is power determined based on a lower boundary value of the rotational speed exclusion range,
   wherein each of the rotational speed exclusion range and the power exclusion range is an open interval in which endpoints at both ends are excluded, and
   wherein the method further comprises:
   setting the maximum allowable power of the wind turbine as the required upper limit of power during the required upper limit of power is not in the power exclusion range.

2. The method according to claim 1, wherein the upper boundary value of the power exclusion range is a product of the upper boundary value of the rotational speed exclusion range and a first predetermined electromagnetic torque, and
   the lower boundary value of the power exclusion range is a product of the lower boundary value of the rotational speed exclusion range and a second predetermined electromagnetic torque,
   wherein the first predetermined electromagnetic torque is an electromagnetic torque that is to be kept before passing through the rotational speed exclusion range from a low rotational speed to a high rotational speed,
   wherein the second predetermined electromagnetic torque is an electromagnetic torque when the wind turbine reaches the lower boundary value of the rotational speed exclusion range.

3. The method according to claim 1, wherein the statistical information about the rotational speed of the generator operating in the rotational speed exclusion range comprises: a statistical duration in which the rotational speed of the generator is in the rotational speed exclusion range and/or a statistical number of times that the rotational speed enters the rotational speed exclusion range.

4. The method according to claim 3, wherein the step of identifying the abnormality of the rotational speed exclusion range for the wind turbine comprises:
   determining, based on operation data in a historical operation period of the wind turbine, a proportion of a rotational speed exclusion duration corresponding to each of time intervals in the historical operation period, wherein the proportion of a rotational speed exclusion duration corresponding to each of time intervals is a proportion of a total duration, in which the rotational speed is in a first predetermined range in the rotational speed exclusion range within the time interval, to a predetermined duration; and determining that there is the abnormality of the rotational speed exclusion range for the wind turbine, in a case that a total number of time intervals, in which a proportion of the rotational speed exclusion duration exceeds a predetermined standard proportion in the historical operation period, exceeds a first predetermined number, wherein each of time intervals has a length of the predetermined duration.

5. The method according to claim 4, wherein the step of determining that there is the abnormality of the rotational speed exclusion range for the wind turbine comprises:

determining that there is the abnormality of the rotational speed exclusion range for the wind turbine, in a case that a total number of time intervals, corresponding to a limited-power operation state and in which a proportion of the rotational speed exclusion duration exceeds a predetermined standard proportion in the historical operation period, exceeds a second predetermined number, or determining that there is the abnormality of the rotational speed exclusion range for the wind turbine, in a case that a total number of time intervals, corresponding to a predetermined wind speed range and in which a proportion of the rotational speed exclusion duration exceeds a predetermined standard proportion in the historical operation period, exceeds a third predetermined number, wherein the predetermined wind speed range is a wind speed range in the vilinity of a wind speed range corresponding to the rotational speed exclusion range.

6. The method according to claim 4, wherein the step of determining, based on operation data in a historical operation period of the wind turbine, a proportion of a rotational speed exclusion duration corresponding to each of time intervals in the historical operation period comprises:

dividing the operation data in the historical operation period into M groups of operation data in an interval of the predetermined duration, wherein each group of operation data comprises N rotational speeds of the generator collected at N consecutive sampling time points; and determining a ratio of the number of rotational speeds in the first predetermined range in the N rotational speeds of each group to N as the proportion of the rotational speed exclusion duration corresponding to the corresponding time interval, wherein M is an integer greater than 1, and N is an integer greater than 1.

7. The method according to claim 4, wherein the predetermined standard proportion is determined based on at least one of the following: a jump-up duration required for the wind turbine to pass through the rotational speed exclusion range from a low rotational speed to a high rotational speed, a jump-down duration required to pass through the rotational speed exclusion range from a high rotational speed to a low rotational speed, a predetermined number of times that the rotational speed exclusion range can be normally passed through within the predetermined duration, and a length of the predetermined duration.

8. The method according to claim 7, wherein the predetermined standard proportion is $T_{max}*I*J/L$, wherein $T_{max}$ represents a maximum among the jump-up duration and the jump-down duration, I represents a redundancy coefficient, J represents the predetermined number of times that the rotational speed exclusion range can be normally passed through within the predetermined duration, and L represents the length of the predetermined duration.

9. A wind turbine, comprising:
a generator, comprising a stator and a rotor mechanically connected to an impeller;
a converter, which is electrically coupled to a stator winding;
a data collection module, configured to collect a rotational speed of the rotor of the generator; and
a controller, configured to set an electromagnetic torque parameter of the converter to control the rotational speed of the generator, wherein the controller is configured to:

determine an upper limit of power required by an instruction for a limited-power operation of the wind turbine;
identify an abnormality of a rotational speed exclusion range for the wind turbine based on statistical information about the rotational speed of the generator operating in the rotational speed exclusion range;
judge that the required upper limit of power is in a power exclusion range corresponding to the rotational speed exclusion range during the abnormality;
set a maximum allowable power of the wind turbine as a lower boundary value of the power exclusion range during the required upper limit of power is in the power exclusion range, wherein an upper boundary value of the power exclusion range is power determined based on an upper boundary value of the rotational speed exclusion range, and the lower boundary value of the power exclusion range is power determined based on a lower boundary value of the rotational speed exclusion range, wherein each of the rotational speed exclusion range and the power exclusion range is an open interval in which endpoints at both ends are excluded, and wherein the controller is further configured to:
set the maximum allowable power of the wind turbine as the required upper limit of power during the required upper limit of power is not in the power exclusion range.

10. The wind turbine according to claim 9, wherein the generator is a permanent magnet generator, and the wind turbine is a direct-drive type wind turbine.

11. The wind turbine according to claim 9, wherein the upper boundary value of the power exclusion range is a product of the upper boundary value of the rotational speed exclusion range and a first predetermined electromagnetic torque, and the lower boundary value of the power exclusion range is a product of the lower boundary value of the rotational speed exclusion range and a second predetermined electromagnetic torque, wherein the first predetermined electromagnetic torque is an electromagnetic torque that is to be kept before passing through the rotational speed exclusion range from a low rotational speed to a high rotational speed, wherein the second predetermined electromagnetic torque is an electromagnetic torque when the wind turbine reaches the lower boundary value of the rotational speed exclusion range.

12. The wind turbine according to claim 9, wherein the statistical information about the rotational speed of the generator operating in the rotational speed exclusion range comprises: a statistical duration in which the rotational speed of the generator is in the rotational speed exclusion range and/or a statistical number of times that the rotational speed enters the rotational speed exclusion range.

13. The wind turbine according to claim 12, wherein identifying the abnormality of the rotational speed exclusion range for the wind turbine comprises:
  determining, based on operation data in a historical operation period of the wind turbine, a proportion of a rotational speed exclusion duration corresponding to each of time intervals in the historical operation period, wherein the proportion of a rotational speed exclusion duration corresponding to each of time intervals is a proportion of a total duration, in which the rotational speed is in a first predetermined range in the rotational speed exclusion range within the time interval, to a predetermined duration; and
  determining that there is the abnormality of the rotational speed exclusion range for the wind turbine, in a case that a total number of time intervals, in which a proportion of the rotational speed exclusion duration exceeds a predetermined standard proportion in the historical operation period, exceeds a first predetermined number,
  wherein each of time intervals has a length of the predetermined duration.

14. The wind turbine according to claim 13, wherein
  determining that there is the abnormality of the rotational speed exclusion range for the wind turbine comprises:
  determining that there is the abnormality of the rotational speed exclusion range for the wind turbine, in a case that a total number of time intervals, corresponding to a limited-power operation state and in which a proportion of the rotational speed exclusion duration exceeds a predetermined standard proportion in the historical operation period, exceeds a second predetermined number, or
  determining that there is the abnormality of the rotational speed exclusion range for the wind turbine, in a case that a total number of time intervals, corresponding to a predetermined wind speed range and in which a proportion of the rotational speed exclusion duration exceeds a predetermined standard proportion in the historical operation period, exceeds a third predetermined number,
  wherein the predetermined wind speed range is a wind speed range in the vilinity of a wind speed range corresponding to the rotational speed exclusion range.

15. The wind turbine according to claim 13, wherein determining, based on operation data in a historical operation period of the wind turbine, a proportion of a rotational speed exclusion duration corresponding to each of time intervals in the historical operation period comprises:
  dividing the operation data in the historical operation period into M groups of operation data in an interval of the predetermined duration, wherein each group of operation data comprises N rotational speeds of the generator collected at N consecutive sampling time points; and
  determining a ratio of the number of rotational speeds in the first predetermined range in the N rotational speeds of each group to N as the proportion of the rotational speed exclusion duration corresponding to the corresponding time interval,
  wherein M is an integer greater than 1, and N is an integer greater than 1.

16. A computer-readable storage medium storing computer programs thereon, wherein the computer programs, when being executed by a processor, cause the processor to:
  determine an upper limit of power required by an instruction for a limited-power operation of a wind turbine;
  identify an abnormality of a rotational speed exclusion range for the wind turbine based on statistical information about a rotational speed of a generator operating in the rotational speed exclusion range;
  judge that the required upper limit of power is in a power exclusion range corresponding to the rotational speed exclusion range during the abnormality;
  set a maximum allowable power of the wind turbine as a lower boundary value of the power exclusion range during the required upper limit of power is in the power exclusion range,
  wherein an upper boundary value of the power exclusion range is power determined based on an upper boundary value of the rotational speed exclusion range, and the lower boundary value of the power exclusion range is power determined based on a lower boundary value of the rotational speed exclusion range,
  wherein each of the rotational speed exclusion range and the power exclusion range is an open interval in which endpoints at both ends are excluded, and
  wherein the computer programs, when being executed by the processor, further cause the processor to:
  set the maximum allowable power of the wind turbine as the required upper limit of power in during the required upper limit of power is not in the power exclusion range.

* * * * *